US011443029B2

(12) United States Patent
Olivera et al.

(10) Patent No.: US 11,443,029 B2
(45) Date of Patent: Sep. 13, 2022

(54) PASSWORD HINT POLICIES ON A USER PROVIDED DEVICE

(71) Applicant: AIRWATCH LLC, Atlanta, GA (US)

(72) Inventors: Rene J. Olivera, Atlanta, GA (US);
Ishan Srivastava, Bangalore (IN);
Aditya Prasad, Bangalore (IN)

(73) Assignee: AIRWATCH LLC, Atlanta, GA (US)

( * ) Notice: Subject to any disclaimer, the term of this patent is extended or adjusted under 35 U.S.C. 154(b) by 119 days.

(21) Appl. No.: 15/223,012

(22) Filed: Jul. 29, 2016

(65) Prior Publication Data
US 2017/0277885 A1 Sep. 28, 2017

(30) Foreign Application Priority Data

Mar. 24, 2016 (IN) .............................. 201641010331

(51) Int. Cl.
*G06F 21/46* (2013.01)
*H04L 9/40* (2022.01)
*H04W 12/08* (2021.01)
*H04W 12/37* (2021.01)

(52) U.S. Cl.
CPC ............ *G06F 21/46* (2013.01); *H04L 63/083* (2013.01); *H04L 63/20* (2013.01); *H04W 12/08* (2013.01); *H04W 12/37* (2021.01)

(58) Field of Classification Search
CPC ....... H04L 63/083; H04L 63/20; H04L 63/21; H04L 63/0428; H04L 63/08; H04L 63/102; H04L 63/0876; G06F 21/6218; G06F 21/31; G06F 21/54; H04W 12/08; H04W 12/06; H04W 12/04
See application file for complete search history.

(56) References Cited

U.S. PATENT DOCUMENTS

| | | | | | |
|---|---|---|---|---|---|
| 6,457,053 | B1 * | 9/2002 | Satagopan | ........ | H04L 29/12283 707/999.2 |
| 7,668,881 | B1 * | 2/2010 | Hoffmann | ............... | G06F 16/10 707/756 |
| 2008/0022281 | A1 * | 1/2008 | Dubhashi | ................ | G06F 9/547 718/102 |
| 2012/0239477 | A1 * | 9/2012 | Cueli | ................... | G06Q 20/027 705/14.23 |
| 2014/0289870 | A1 * | 9/2014 | Selander | ................. | G06F 21/46 726/28 |
| 2015/0281216 | A1 * | 10/2015 | Donohue | .............. | H04L 63/083 713/171 |

OTHER PUBLICATIONS

Li et al., A biometric-based Password Authentication with key Exchange Scheme using Mobile Device for Multi-Server Environment, Applied Math & Informational Sciences, 2015, pp. 1123-1137 (Year: 2015).*

(Continued)

*Primary Examiner* — Luu T Pham
*Assistant Examiner* — Edward X Long
(74) *Attorney, Agent, or Firm* — Thomas | Horstemeyer, LLP

(57) ABSTRACT

Disclosed are various examples for remotely managing passwords using local security policies. A client device can be enrolled with a management service. The management service then transmits a password policy requiring a password hint to be defined by the user. A management component executed on the client device can then enforce the password policy by requiring a user to define a password hint in order to access enterprise resources.

20 Claims, 4 Drawing Sheets

(56) References Cited

OTHER PUBLICATIONS

Kim et al., Efficient and Dynamic Location-based Event Service for Mobile Computing Environments, Fifth International Conference on Computational Science and Applications, 2007, pp. 409-415. (Year: 2007).*

* cited by examiner

PASSWORD HINT POLICIES ON A USER PROVIDED DEVICE

RELATED APPLICATIONS

Benefit is claimed under 35 U.S.C. 119(a)-(d) to Foreign Application Serial No. 201641010331 filed in India entitled "PASSWORD HINT POLICIES ON A USER PROVIDED DEVICE", filed on Mar. 24, 2016, by AIRWATCH LLC, which is herein incorporated in its entirety by reference for all purposes.

BACKGROUND

A computing device can be protected by a password by a user to limit access to the machine. In certain environments, a user's password can be locally modifiable and locally stored by the operating system of the computing device. In some instances the user's password to access his or her computing device can differ from the user's network password. The user's network password can be, for example, a password defined by the user or an administrator in a corporate environment. In one instance, a user's password for his or her identity in an Active Directory® environment can differ from the user's password to access his or her laptop in a bring-your-own-device (BYOD) environment. In the context of this disclosure, the user's password to access his or her own laptop is referred to as the user's local password, while the user's password associated with the user's identity in a directory service or enterprise environment is referred to as the user's network password.

In some cases, the user's local password can differ from the user's network password. Additionally, in some BYOD environments, the user's local password cannot be determined or reset by an administrator in the enterprise environment. While an administrator can, in many cases, determine or reset the user's network password, if the user's local password is associated with a computing device that was not issued by the enterprise, the administrator might be unable to assist the user with accessing the computing device. For example, the administrator is typically not able to assist a user with determining a local password for the user's home personal computer or laptop.

This scenario is distinguishable from scenarios in which the computing device is connected to a directory service, such as when a computing device is connected to a domain controller for Microsoft's Active Directory® or other directory services. In this scenario, an administrator can reset the user's network password or issue a new or temporary password so that the user can access a computing device that is enrolled with the directory service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
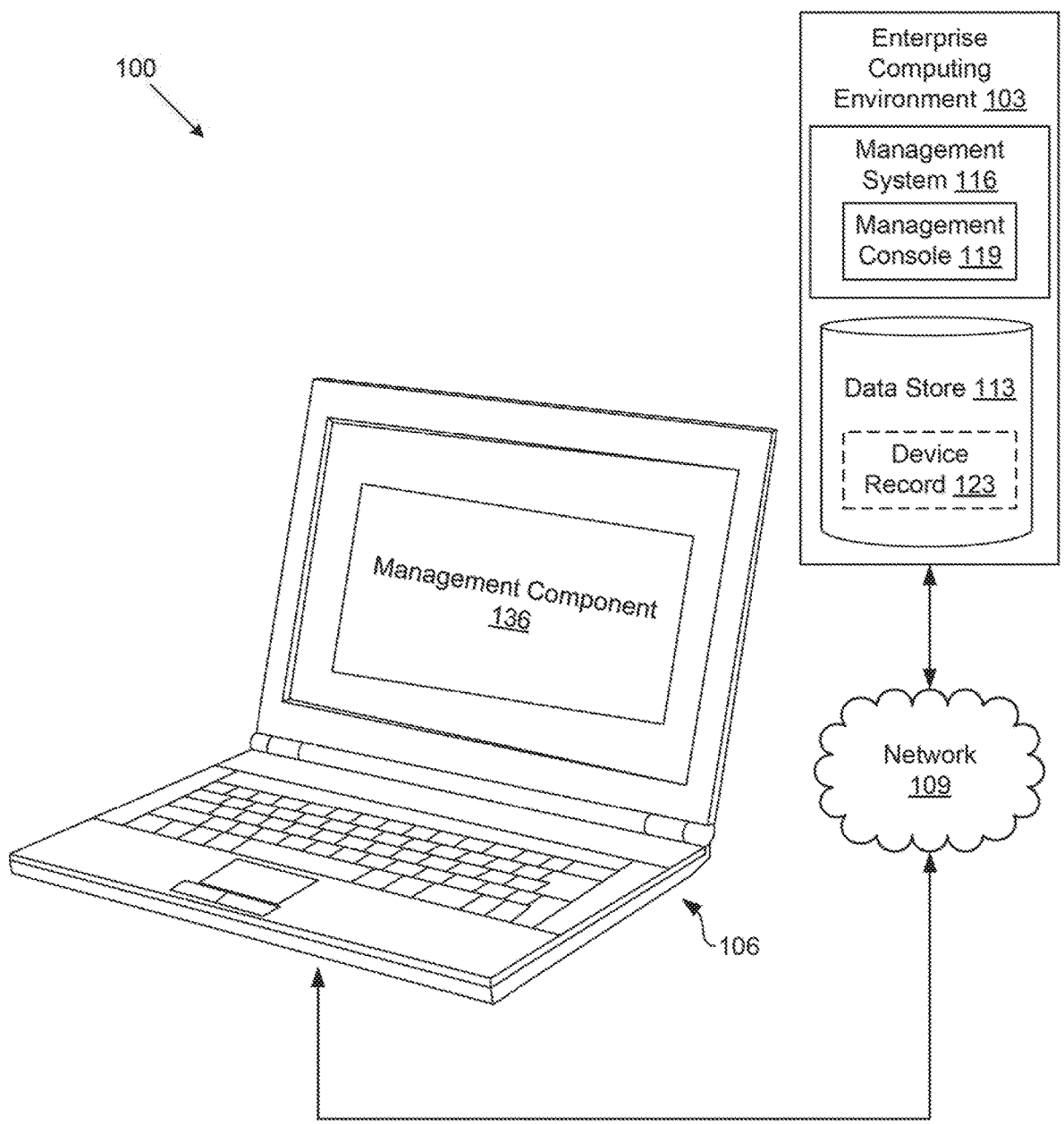
FIG. 1 is a drawing depicting the operation of various examples of the disclosure in a networked environment.

Disclosed are various examples for remotely managing password policies on client devices using local security policies that can be assigned to client devices through a management component or another application that is executed by the client device. The local security policies can be enforced by the management component on the client device. As noted above, a client device can, in many cases, be secured by a local password of a user that can differ from the user's network password. In this scenario, the user's network password secures access to the user's identity in a directory service, such as an Active Directory® environment. The user's local password might secure access to the user's client device, such as the user's home personal computer (PC) or laptop.

In this scenario, the user's home PC or laptop is not a device that is issued by the organization associated with the directory service, nor is it joined to the domain associated with the directory service. Accordingly, an administrator in the enterprise or directory service environment might have limited capabilities with respect to managing the local password of the user's client device. For example, in a bring-your-own-device (BYOD) enterprise environment, a user can use his or her own computing device to access enterprise resources that are secured by the user's identity in an Active Directory environment.

A client device can have a local security policy enforced by the management component that specifies password or passcode requirements. These requirements can govern the user's local password. The user's network password can be governed by policies that are specified or enforced through a directory service associated with an enterprise environment. One example of a local security policy that is related to the user's local password can be a requirement that the user specify a password hint that is associated with the user's local password. An administrator might wish to impose the requirement to define a password hint for the user's local password because the administrator often has limited or no ability to reset the user's local password.

Accordingly, if a user forgets his or her local password, the administrator is often unable to render assistance to the user, which is in contrast to the administrator's ability to reset or redefine the user's network password for the user's identity in the directory service. In one scenario, in order to access enterprise resources that are associated with a user's organization, such as the user's employer, university, or any other entity employing a directory service, from a particular client device, the organization can require that the user enroll the client device with a management service. Enrollment of the client device with the management service can also require installation of a management component on the client device, which can receive and enforce policies and profiles from the management service. The administrator can specify a particular policy that requires the user to define a password hint that is associated with the user's local password, which can be enforced through the management component as will be described herein.

With reference to FIG. 1, shown is an illustrative example of a networked environment 100 according to examples of the disclosure. In the depicted network environment 100, an enterprise computing environment 103 is in communication with at least one client device 106 over a network 109.

The network 109 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or other organization. The enterprise computing environment 103 includes a computing device, such as a server computer, that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 includes multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein. Generally, the enterprise computing environment 103 can be operated in accordance with particular security protocols such that the enterprise computing environment 103 can be considered a "trusted" computing environment by the enterprise that operates the enterprise computing environment 103.

Various applications or other functionality can be executed in the enterprise computing environment 103 according to various examples. Also, various data can be stored in a data store 113 that can be accessible to the enterprise computing environment 103. The data store 113 can be representative of a plurality of data stores 113. The data stored in the data store 113 can be associated with the operation of the various applications or functional entities described below.

The client device 106 can represent multiple client devices 106 coupled to the network 109. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 includes output devices, such as a display and audio speakers, as well as one or more input devices, such as a mouse, keyboard, touch pad, or touch screen, which can facilitate a user interacting with the client device 106. The client device 106 can also execute a management component 136, for example, to monitor and manage data, software components, and hardware components with respect to the client device 106, as described in further detail below.

Various security settings and other aspects of the client device 106 can be controlled by local security profiles that are stored on the client device 106 by the management component 136. One example of a local security profile can define a policy regarding whether a user is required to define a password or passcode hint that is associated with the user's local password or a local user account on the client device 106. A local password can correspond to a local user account on the client device 106 that is a distinct account or identity from a user identity in a directory service, such as an Active Directory environment that can be associated with the enterprise computing environment 103. A local security profile can also include registry values and settings that are stored elsewhere on the client device 106.

A user's local password and password hint can be stored by the operating system in a system registry. In a Microsoft Windows® environment, for example, the system registry is a database or data store that stores settings for the operating system as well as applications that are installed on the client device 106. The user's password or password hint can be stored in art encrypted or scrambled format within the system registry for security purposes. In some cases, the password hint is not stored in an encrypted or scrambled format in the system registry. A local security policy that specifies that a user is required to define a password hint for the user's local password can be enforced by the management component 136, which is an application that can be executed by the client device 106 to facilitate enrollment of the client device 106 with a management service 116 and enforce compliance rules and policies associated with the user's enterprise environment.

Figure 2:
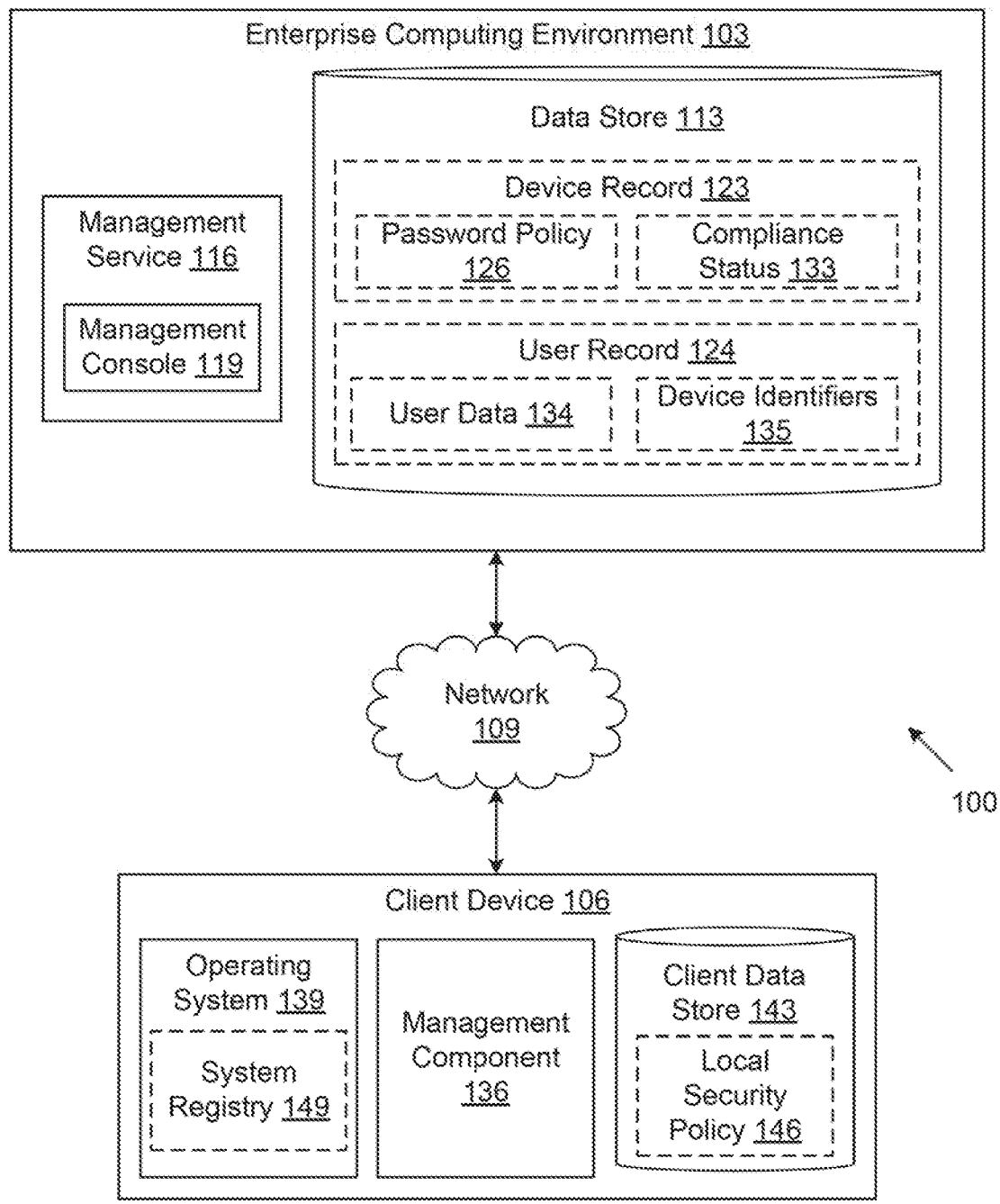
FIG. 2 is a drawing depicting the operation of various examples of the disclosure in a networked environment.

With reference to FIG. 2, shown is schematic diagram of the networked environment 100 according to various examples of the present disclosure. As noted above, the enterprise computing environment 103 can be in communication with a client device 106 over a network 109. The components executed on the enterprise computing environment 103 can include a management service 116 and other applications, services, processes, systems, engines, or functionality not discussed in detail herein. The management service 116 can be executed in the enterprise computing environment 103 to monitor and oversee the operation of one or more client devices 106. In some examples, the management service 116 can include a management console 119, which can facilitate the administration of client devices 106 by administrators. For instance, the management console 119 can generate user interfaces that can allow administrators to operate and interact with the management service 116. The user interfaces can allow an administrator to define policies for a user account or devices associated with an enterprise environment. The user interfaces can also include, for example, presentations of statistics or other information regarding the client devices 106 that can be managed by the management service 116.

The data stored in the data store 113 can include one or more device records 123, user records 124, and potentially other data. A device record 123 can represent various security settings selected for enforcement on a client device 106 that is enrolled with the management service 116. Accordingly, a device record 123 can include a password policy 126, a compliance status 133, and potentially other data. The device record 123 can also store other device specific information, such as whether a device is a user's personal device, or a "BYOD" device. In some scenarios, an enterprise can require that a user install a management component 136 on his or her personal device in order to access resources of the enterprise, such as email, documents, calendar data, and other information. The device record 123 can also specify whether a client device 106 is a domain joined device, such as a device that belongs to or was issued by an enterprise to a user. In this scenario, a client device 106 can be a computing device or a peripheral device, such as a printer, scanner, or other device that can be deployed in an environment and associated with a record in a directory service.

A password policy 126 can represent one or more polices or requirements for passwords or passcodes of users of the client device 106. A password policy 126 can specify whether the user is required to define a password hint associated with his or her password. In one example, the device record 123 can indicate that a particular client device 106 is a BYOD device that is executing a version of an operating system that does not allow for a password reset to be performed in the event of a lost or forgotten local password. Accordingly, the password policy 126 can specify that a password hint must be specified by a user for BYOD devices that are enrolled with the management service 116.

The password policy 126 can also identify one or more specified actions that can be performed by the management component 136 on the client device 106 when a password hint has not been defined by a user as specified in the password policy 126. For example, if the password policy 126 specifies that a user of the client device 106 must have a password hint associated with a local password associated with the client device 106, a specified action can be that the operating system 139 or management component 136 continually prompts the user to create a password hint. As another example, a specified action can indicate that if the user is changing his or her local password, that they should also update, if necessary, the password hint that corresponds to the updated local password. In another scenario, if the user has not defined a password hint, the management component 136 can restrict access to at least some of the functionality of the client device 106 or to remotely accessible enterprise resources, such as the user's email or any data that is accessible through the enterprise computing environment 103.

In some instances, specified actions identified by a password policy 126 must be taken in a specified order. For example, the actions defined by a password policy 126 for failure to define a password hint may need to be applied or enforced before account lockout settings or screen lockout settings are applied or enforced. Otherwise, a user could be placed in the position of being locked out of and unable to use the client device 106. For example, the screensaver could activate and require a password or passcode to unlock, but before the user has specified a password hint, making it impossible for the user to set a password hint.

The device record 123 can also specify other types of policies other than a password policy 126 that can be enforced by the management service 116 or management component 136. The example of a password policy 126 requiring a password hint to be defined for a local password of a user is one example according to this disclosure. For example, the device record 123 can identify other user specific or device specific policies that are associated with a particular client device 106 or a user of the client device, such as policies that are related to the location of the client device 106, network settings of the client device 106, applications that are installed on the client device 106, or any other properties associated with the configuration of the client device 106.

A compliance status 133 can represent whether the client device 106 currently complies with the password policy 126 or other compliance rules or policies that are specified by the device record 123. The compliance status 133 can be determined by the management service 116 or the management component 136 by analyzing the status of the client device 106 and determining whether the client device 106 complies with the various policies that are stored on the client device 106 as local security policies 146 or policies that are associated with a device record 123 of the client device 106.

The compliance status 133 can, in some examples, be rendered by the management console 119 to provide a user of the management console 119 with information regarding which client devices 106 are currently compliant with their corresponding password policy 126 or other policies.

A user record 124 contains information about users who are associated with client devices 106 that are enrolled with the management service 116. A user record 124 can include various user data 134. User data 134 can include profile information about a user, authentication information about a user, and other user information. For example, user data 134 can include information about client devices 106 that are associated with a user account of the user, enterprise resources to which a particular user has access, such as email, calendar data, documents, media, applications, network sites, or other resources. The user record 124 can also identify one or more user groups to which a particular user belongs, which can in turn define the access rights of the user to one or more enterprise resources.

A user record 124 can further identify one or more device identifiers 135. A device identifier 135 can uniquely identifies client devices 106 that are associated with a user account of the user. The user record 124, in some instances, can identify one or more compliance rules or compliance policies that are associated with the user account and that can be enforced against the various client devices 106 that are linked with the user's account.

The client device 106 is representative of multiple client devices 106 that are coupled to the network 109. The client device 106 can also be configured to execute a management component 136, an operating system 139, as well as other applications. The client device 106 can also include a local data store 143, which can store one or more local security policies 146 that are stored on behalf of the management component 136. The local security policies 146 can represent policies or profiles that are installed on the client device 106 that are enforced by the management component 136.

The management component 136 can be executed in the client device 106, for example, to monitor and manage data, software components, and hardware components with respect to the client device 106. The management component 136 communicates with the management service 116 to facilitate monitoring and managing the client device 106 by the management service 116. For example, the management component 136 transmits data that indicates the status of properties and settings for the client device 106, such as configuration settings for one or more local security policies 146. The management service 116 can log data received from the management component 136 or take one or more specified actions based upon compliance rules or policies that are enforced by the management service 116.

The management component 136 can also store or generate updates for the local security policies 146. In one example, the management component 136 functions as a device management agent that operates in the application layer of the client device 106. The management component 136, in other examples, can include an application wrapper that interfaces with a software component to facilitate overseeing, monitoring, and managing resources for the client device 106. In alternative examples, the management component 136 includes a portion of an application that was developed, for example, using a Software Development Kit (SDK) so that the monitoring and management functionality is provided using the application.

A local security policy 146 can represent a policy or profile that is associated with the management component 136. The local security policy 146 can specify one or more security settings enforced by the management component 136 on the client device 106 or a user of the client device 106. For example, these security settings within the local security policy can include whether a password hint is required to be defined for a local password associated with a local user identity on the client device 106. A local security policy 146 can also define other security requirements for a user to use the client device 106, such as whether a password is required to login to or unlock the client device 106, a password strength requirement, an account lockout setting, a screensaver lockout setting, or other security settings. A password strength requirement can specify a minimum number of characters for a password, the types of permissible characters, a minimum number of characters from a particular set of characters (e.g. a minimum number of letters, a minimum number of numerals, or similar requirements). An account lockout setting can specify a maximum number of login attempts for the client device 106 before a user of the client device 105 is locked out or a length of time that a user can be locked out of the client device 106 after failing to successfully login to the client device 106. A screensaver lockout setting can specify whether a password is required to exit a screensaver. However, in some examples, the account lockout setting or the screen lockout setting may be specified in a separate set of screen inactivity settings.

The operating system 139 of the client device 106 can include Microsoft Windows® operating system, MacOS®, Linux or Unix operating system variants, or other operating systems. In one example, the operating system 139 can maintain a system registry 149, which is a database or data store that contains one or more device specific, application specific, or user specific preferences, settings or other variables. In some examples, a password hint, if defined by a user, is stored in a particular location within the system registry 149 so that it can be retrieved by the operating system 139 and other applications having access to the system registry 149 when needed. Additionally, in some scenarios, the system registry 149 can be stored in the client data store 143 or in any other memory or mass storage device associated with the client device 106.

Next, a general description of the operation of the various components of the networked environment 100 is provided. To begin, a client device 106 can be enrolled with the management service 116 in response to installation of the management component 136 on the client device 106 and authentication of user credentials associated with the client device 106 or an identity of a user in a directory service. As a requirement to allow a user to access enterprise resources using a client device 106, an enterprise can require the user to enroll the client device 106 as a managed device with the management service 116. In this scenario, the management service 116 can be executed remotely from the client device 106, such as by an enterprise computing environment 103. To complete enrollment of the client device 106, an enterprise can require the user to allow the management component 136 to be executed as a process with administrative privileges. In some instances the management component 136 can be executed with elevated or administrative privileges by obtaining consent of a user of a BYOD device.

In one example, the management component 136 can be executed using the Psexec.exe process that is available for Microsoft Windows®, which allows a process to be invoked as a system process. In this way, the management component 136 is executed with the ability to access the system registry 149. In other examples, the management component 136 is executed with sufficient privileges by the operating system 139 such that it can access the system registry 149 location where the password hint associated with a local password of the user is stored.

The management component 136 can prompt the user for his or her credentials associated with the user's identity in an enterprise environment, such as the user's Active Directory credentials. The management component 136 can also determine whether the client device 106 on which it is installed is a domain joined device or a BYOD device. In one example, the management service 116 can receive the credentials from the management component 136 and authenticate the user's identity. The management service 116 can also receive an indication of whether the client device 106 is a domain joined device or a BYOD device. The management service 116 can then create a device record 123 that corresponds to the client device 106. As noted above, an administrator can define a password policy 126 and other compliance rules 133 that are to be associated with a newly enrolled device that corresponds to BYOD devices. As noted above, in one scenario, the password policy 126 can specify whether a password hint is required to be defined for an instance in which the user is enrolling a BYOD device where a local password or local user identity is defined that is not the user's identity in an enterprise environment, such as in an Active Directory® environment associated with the enterprise.

The management service 116 can then provide the password policy 126 associated with the client device 106 to the management component 136. Upon receiving the password policy 126, the management component 136 can store the password policy 126 as a local security policy 146 within the client data store 143. If the password policy 126 received from the management service 116 requires the user to define a password hint associated with the local password of the user, the management component 136 can access the system registry 149 and determine whether a password hint is defined. If no password hint is defined, the management component 136 can prompt the user to define a password hint. In some instances, the management component 136 can prompt the user to define a new local password associated with the local identity of the user on the client device 106.

The management component 136 can then update the system registry 149 with the password hint and the updated local password if the user's local password has been updated. In one scenario, the management component 136 can obtain the password hint or a new local password through user interfaces generated by the management component 136. The management component 136 can then save the password hint or updated local password in the appropriate location in the system registry 149. In one example, the management component 136 can update the password hint or updated local password using application programming interface (API) calls provided by the operating system 139, such as Microsoft Windows®, that allow updating of the password or password hint.

If the password policy 126 specifies that a password hint does not have to be defined, the management component 136 can take no action with respect to whether a password hint is defined within the system registry 149. In some scenarios, the password policy 126 can specify that a password hint is required based upon an identity of the user or a membership of the user in a user group in a directory service associated with an enterprise environment. For example, the password policy 126 can specify that client devices 106 associated with users that are a member of a certain user group are not required to define a password hint, whereas users who are members of another user group are required to define the password hint.

Therefore, by enacting a password policy 126 for BYOD devices that requires a password hint to be defined by the user, an administrator of an enterprise environment can reduce support requests from users requesting support for help with a lost or forgotten local password of the user that the administrator has little or no ability to reset on behalf of the user. This is in contrast to the user's password for the identity of the user in the enterprise environment, which the administrator can reset or obtain on behalf of the user.

Figure 3:
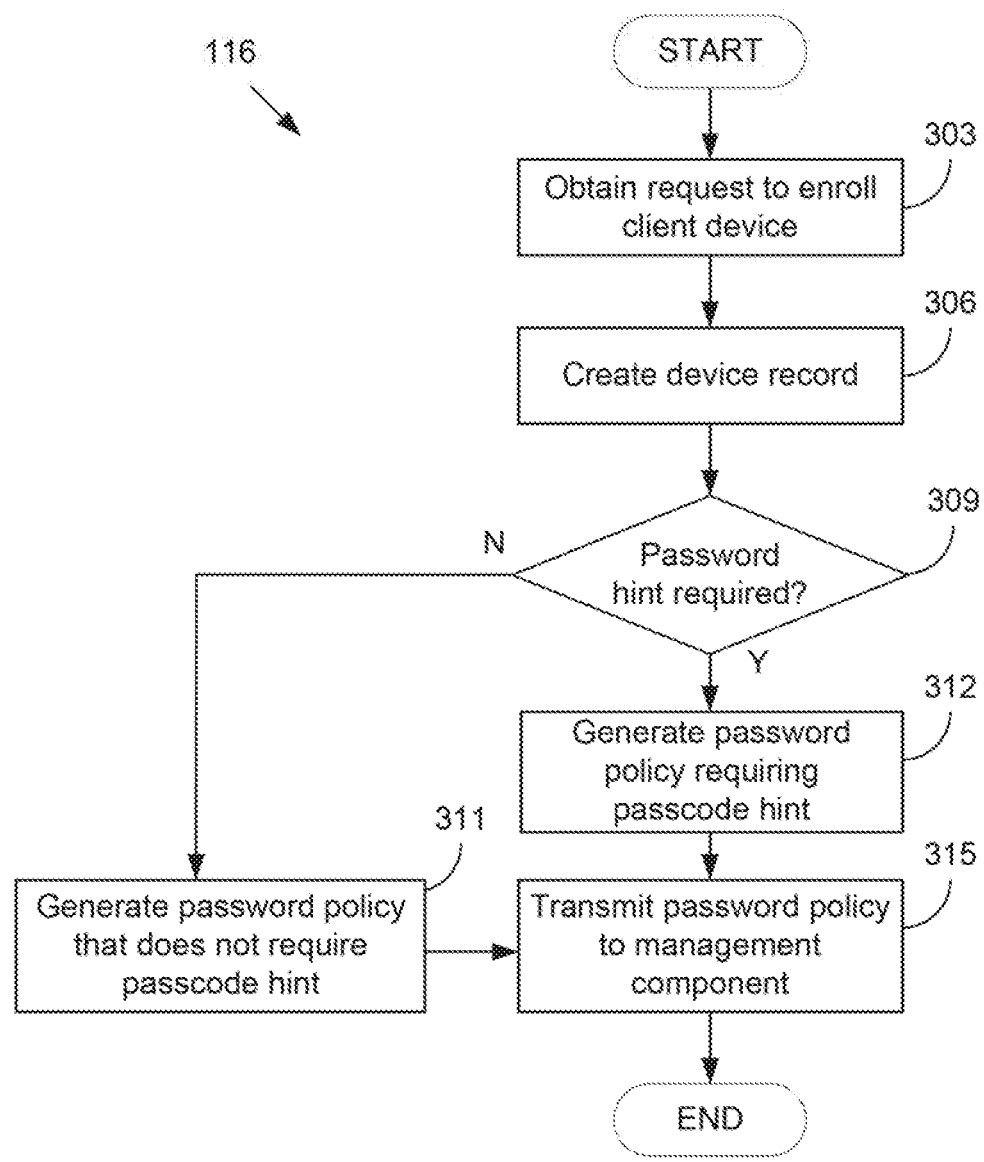
FIG. 3 is a flowchart illustrating one example of functionality according to various examples of the disclosure.

Referring next to FIG. 3, shown is a flowchart that provides one example of the operation of a portion of the management service 116. As an alternative, the flowchart of FIG. 3 can be viewed as depicting an example of elements of a method implemented in the enterprise computing environment 103.

Beginning at step 303, the management service 116 can obtain a request to enroll a client device 106 with the management service 116. The request to enroll the client device 106 can be received from a management component 136 executed by the client device 106. The request to enroll the client'device 106 can include information about the client device 106, such as a device identifier, as well as information about the user, such as the user's credentials for the user's identity in the enterprise environment, such as an Active Directory® identity of the user. The management service 116 can authenticate the user's credential as well as extract information about the device from the request received from the management component 136. In one example, the request can include an indication of whether the device is a domain joined device or a personal device of the user, such as a BYOD device. Additionally, the request can include additional information about the client device 106, such as the operating system type and version, network address, physical location, or other parameters and variables about the client device 106 that can be populated into a device record 123.

At step 306, the management service 116 can create a device record 123 associated with the client device 106 within the data store 113. Creation of the device record 123 can facilitate enrollment of the client device 106. As noted above, the password policy 126, compliance rules 133, and other device specific data can be stored in the device record 123. At step 309, the management service 116 can determine whether a password hint is required to be defined for the client device 106. The determination can be made based upon an identity of the user as well as the characteristics of the client device 106, such as the operating system 139 of client device 106, the version of the operating system 139, whether the device is a home personal computer or laptop of a user, such as a BYOD device, or based upon any other criteria that can be specified by an administrator. In some scenarios, the client device 106 may not support defining a password hint. In other scenarios, the administrator may wish to only require a password hint for devices that are not domain joined devices. In some scenarios, the administrator can specify that a password hint is required in all cases for client devices 106 that are enrolled with the management service 116.

If the management service 116 determines at step 309 that a password hint is not required for the client device 106, the management service can generate a password policy 126 that does not indicate that a password hint is required to be defined by the user at step 211. The process then proceeds to step 215, where the management service 116 transmits the password policy 126 to the client device 106. If the management service 116 determines at step 309 that a password hint is required to be defined by the user of the client device 106, then at step 312, a password policy 126 is generated that indicates that a password hint is required to be defined by the user. At step 315, the management service 116 transmits the password policy 126 to the client device 106. Thereafter, the process proceeds to completion.

Figure 4:
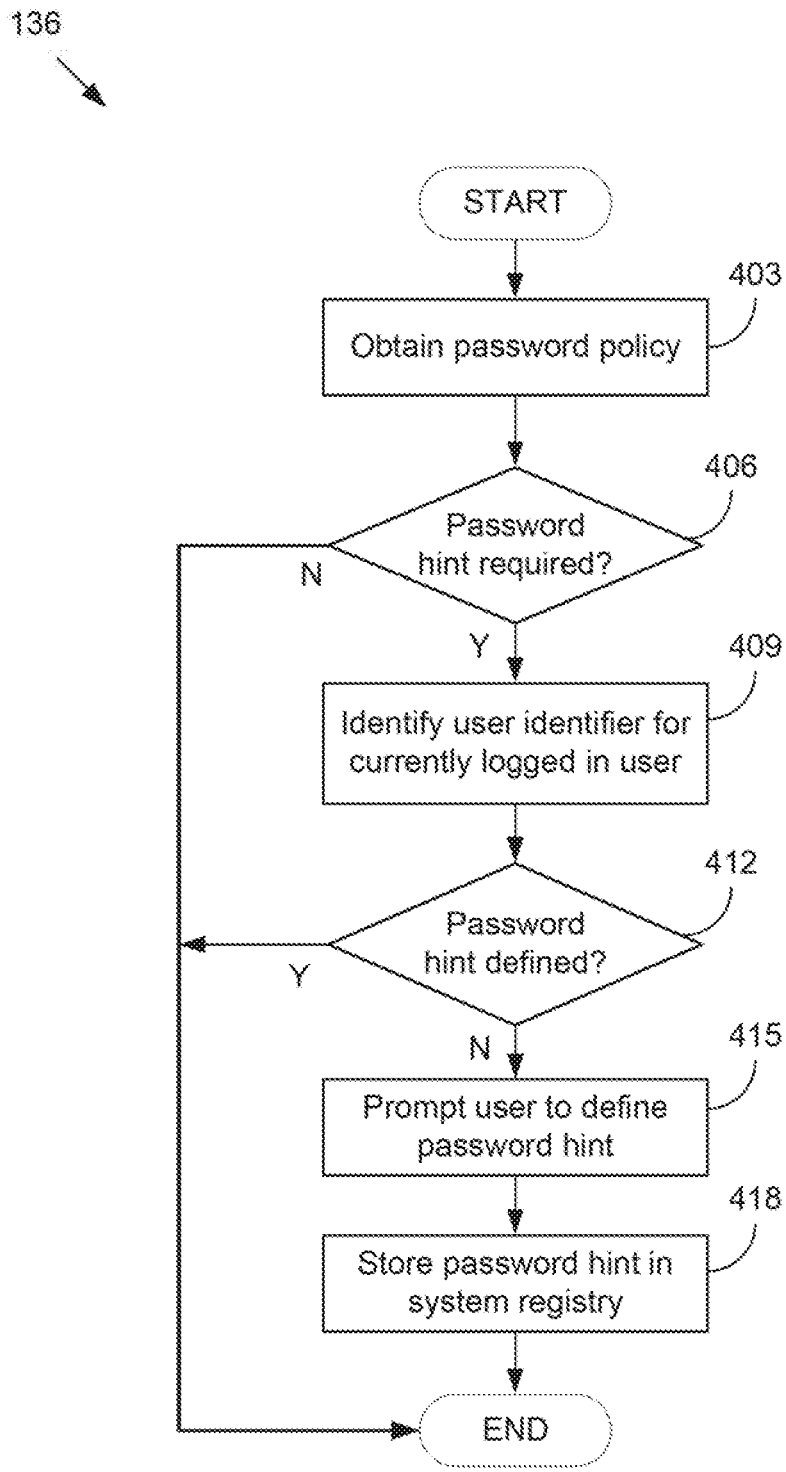
FIG. 4 is a flowchart illustrating one example of functionality implemented in a client device according to various examples of the disclosure.

Referring next to FIG. 4, shown is a flowchart that provides one example of the operation of a portion of the management component 136. As an alternative, the flowchart of FIG. 4 can be viewed as depicting an example of elements of a method implemented in the client device 106. FIG. 4 illustrates how the management component 136 can obtain a password policy 126 from the management service 116 and enforce a policy that requires the user to define a password hint associated with a local password of the user.

First, at step 403, the management component 136 can obtain a password policy 126 from the management service 116. In one example, the management component 136 can store the password policy 126 as a local security policy 146. At step 406, the management component 136 can determine whether the password policy 126 obtained from the management service requires that a password hint be defined for the user's local password. If not, then the process proceeds to completion. If the password policy 126 requires that a password hint be defined by the user, the management component 136 then identifies a user identifier for a currently logged in user at step 409. In other words, the management component 136 identifies a user identifier for the user's local identity on the client device 106. The appropriate user identifier is needed in order to determine a storage location of the password hint in the system registry 149. For example, in the case of a Microsoft Windows 7® operating system 139, the password hint is stored in a registry entry in the system registry 149 that is named based upon a particular user identifier of the local user account of the user.

Accordingly, in the case of a Microsoft Windows® environment, the management component 136 can make a Win32 or Windows API call to obtain the security identifier (SID) of the currently logged in user. The management component 136 can then extract the relative identifier (RID) of the currently logged in user from the SID. The RID is part of a security identifier which uniquely identifies a user account on the device. In one example, the RID is an eight character hex string with a one character pad that identifies the currently logged in user within the system registry 149. In another example, the RID is an eight character string with hexadecimal representation of an identifier of the user padded with a '0' on the left side that is stored within the system registry 149. The entry in the system registry 149 at which the password hint is stored is based upon the RID in the case of a Microsoft Windows® environment on the client device 106. As one example, the password hint is stored at the following entry in the system registry 149:

HKLM\SAM\SAM\Domains\Account\Users\<RID>\UserPasswordHint

In the above, <RID> represents the RID of the currently logged in user on the client device 106.

Next, at step 412, the management component 136 determines whether a password hint has already been defined at the registry entry in the system registry 149. If so, the management component 136 can determine that the client device 106 complies with the password policy 126 and proceed to completion. In alternative examples, the management component 136 can display the password hint that is defined in the system registry 149 to the user and request the user to confirm that he or she is satisfied with the password hint. If no password hint is defined in the system registry 149, the management component 136 can prompt the user to define a password hint at step 415. In some examples, the management component 136 can display a user interface that requires the user to define a password hint before the user interface can be hidden or removed. In another example, the management component 136 can provide a periodic notification that the client device 106 is not in compliance with the password policy 126 and prompt the user to define a password hint. The management component 136 can also lock a client device 106 until a password hint is defined by the user through a user interface element initiated by the management component 136.

Upon receiving a password hint from the user, the management component 136 can store the password hint in the system registry 149 at step 418. In one example, the management component 136 can store the password hint in the system registry 149 using a Win32 or Windows API call that allows the management component 136 to overwrite or save an entry to the system registry 149. Thereafter, the process proceeds to completion.

The flowcharts of FIGS. 3 and 4 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3 and 4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages might be added to the logical flow described herein, for purposes of enhanced utility, accounting, performance measurement, or troubleshooting aid. It is understood that all such variations are within the scope of the present disclosure.

The enterprise computing environment 103, the client device 106, or other components described herein can each include at least one processing circuit. Such a processing circuit can include one or more processors and one or more storage devices that are coupled to a local interface. The local interface can include a data bus with an accompanying address/control bus or any other suitable bus structure.

The one or more storage devices for a processing circuit can store data or components that are executable by the one or more processors of the processing circuit. The management service 116, management component 136, or other components can be stored in one or more storage devices and be executable by one or more processors. Also, a data store, such as the data store 113 or the client data store 143, can be stored in the one or more storage devices.

The management service 116, the management component 136, and other components described herein can be embodied in the form of hardware, as software components that are executable by hardware, or as a combination of software and hardware. If embodied as hardware, the components described herein can be implemented as a circuit or state machine that employs any suitable hardware technology. Such hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

The invention claimed is:

1. A non-transitory computer-readable medium embodying a management component executed by a client device, wherein the management component is configured to cause the client device to at least:

enroll the client device, through the management component installed on the client device, with a management service;

in response to enrollment of the client device with the management service, determine that a local security policy stored by the management component on the client device indicates that a password hint is required to be defined by a user for a local password corresponding to the client device;

extract a Windows Relative Identifier (RID) from a Windows Security Identifier (SID) associated with a local user identity of the client device;

determine that a registry entry in a system registry of the client device fails to comprise the password hint, the registry entry being based upon the RID;

prompt a user to define the password hint associated with the local password corresponding to the client device; and store the password hint in the registry entry on the client device.

2. The non-transitory computer-readable medium of claim 1, wherein the management component is further configured to cause the client device to at least identify the registry entry on the client device associated with the password hint by determining a user identifier corresponding to the local user identity of the client device.

3. The non-transitory computer-readable medium of claim 1, wherein the management component is further configured to cause the client device to obtain the SID using a Windows application programming interface (API) call to retrieve the SID associated with a currently logged-in user.

4. The non-transitory computer-readable medium of claim 1, wherein the management component is executed as a system process to access the registry entry.

5. The non-transitory computer-readable medium of claim 1, wherein the local security policy is obtained by the management component from the management service.

6. A method comprising:
enrolling, by a management component, a client device with a management service, wherein the management component is installed on the client device;
in response to enrolling the client device with the management service, determining, by the management component, that a local security policy stored by the management component on the client device indicates that a password hint is required to be defined by a user for a local password corresponding to the client device;
extracting, by the management component, a Windows Relative Identifier (RID) from a Windows Security Identifier (SID) associated with a local user identity of the client device;
determining, by the management component, that a registry entry in a system registry of the client device fails to comprise the password hint, the registry entry being based upon the RID;
prompting, by the management component, a user to define the password hint associated with the local password corresponding to the client device; and
storing, by the management component, the password hint in the registry entry.

7. The method of claim 6, further comprising identifying, by the management component, the registry entry on the client device associated with the password hint by determining a user identifier corresponding to the local user identity of the client device.

8. The method of claim 6, wherein the management component is further configured to cause the client device to obtain the SID using a Windows application programming interface (API) call to retrieve the SID associated with a currently logged-in user.

9. The method of claim 6, wherein the management component is executed as a system process to access the registry entry.

10. The method of claim 6, wherein the local security policy is obtained by the management component from the management service.

11. A system comprising:
a client device; and
a management component executable by the client device, wherein the management component causes the client device to at least:
enroll a client device, through a management component installed on the client device, with a management service;
in response to enrollment of the client device with the management service, determine that a local security policy stored by the management component on the client device indicates that a password hint is required to be defined by a user for a local password corresponding to the client device;
extract a Windows Relative Identifier (RID) from a Windows Security Identifier (SID) associated with a local user identity of the client device;
determine that a registry entry in a system registry of the client device fails to comprise the password hint, the registry entry being based upon the RID;
prompt a user to define the password hint associated with the local password corresponding to the client device; and
store the password hint in the registry entry.

12. The system of claim 11, wherein the management component is further configured to cause the client device to at least identify the registry entry on the client device associated with the password hint by determining a user identifier corresponding to the local user identity of the client device.

13. The system of claim 11, wherein the management component is further configured to cause the client device to obtain the SID using a Windows application programming interface (API) call to retrieve the SID associated with a currently logged-in user.

14. The system of claim 11, wherein the local security policy is obtained by the management component from the management service.

15. The non-transitory computer-readable medium of claim 1, wherein the management component is further configured to cause the client device to:
lock the client device in response to determining that the registry entry fails to comprise the password hint; and
unlock the client device in response to the user defining the password hint.

16. The non-transitory computer-readable medium of claim 1, wherein the management component is further configured to cause the client device to store the password hint in the registry entry using a Windows application programming interface (API) to save the password hint to the registry entry.

17. The method of claim 6, further comprising:
locking, by the management component, the client device in response to determining that the registry entry fails to comprise the password hint; and
unlocking, by the management component, the client device in response to the user defining the password hint.

18. The method of claim 6, wherein the management component is further configured to cause the client device to store the password hint in the registry entry using a Windows application programming interface (API) to save the password hint to the registry entry.

19. The system of claim 11, wherein the management component is further configured to cause the client device to:
lock the client device in response to determining that the registry entry fails to comprise the password hint; and
unlock the client device in response to the user defining the password hint.

20. The system of claim 11, wherein the management component is further configured to cause the client device to store the password hint in the registry entry using a Windows application programming interface (API) to save the password hint to the registry entry.

* * * * *